United States Patent Office 3,324,123
Patented June 6, 1967

3,324,123
PROCESS FOR PREPARING N-SUBSTITUTED-2-MORPHOLONES
Moses Cenker, Trenton, Mich., assignor to Wyandotte Chemicals Corporation, Wyandotte, Mich., a corporation of Michigan
No Drawing. Continuation of application Ser. No. 248,259, Dec. 31, 1962. This application Aug. 5, 1965, Ser. No. 477,588
21 Claims. (Cl. 260—247.7)

This application is a continuation of my pending application, Ser. No. 248,259, filed Dec. 31, 1962, now abandoned.

This invention relates to a new process for making substituted morpholones. In a more specific aspect, this invention relates to a catalytic method for dehydrogenating substituted diethanolamines to produce the corresponding substituted morpholones.

Morpholones are useful in the preparation of other chemicals. For example, morpholones can be reacted with long-chain alkyl or aralkyl halides to yield quaternary ammonium compounds which are useful as wetting agents, textile assistants and germicidal ampholytic detergents. Furthermore, low molecular weight morpholones are known to form stable chelates with most transition elements. Morpholones can also be reacted with glycols and polyglycols to yield esters which undergo self-catalyzed reaction with diisocyanates to give polyurethanes. However, despite their many uses, substituted morpholones have not been available in large volume because of the heretofore difficulty in preparing them. Furthermore, the prior art offers very little regarding methods for synthesizing morpholones.

Kiprianov, Ukran Khem Zhur, 2, 236 (1926) reported synthesizing 4-hydroxyethyl-2-morpholone and 4-hydroxyethyl-3-methyl-2-morpholone by reacting ethyl esters of glycine and alanine with ethylene oxide followed by dehydration of the bis(hydroxyethyl)amino acids. Much later M. L. Pascal and M. Dilepine, Compt. Rend., 244, 1514–16 (1957) synthesized 2,6-dimethylmorpholone by the reaction of sarcosine with propylene oxide. Subsequently, M. L. Pascal, Bulletin Société Chimique de France, 435–442 (1960), synthesized other morpholones by reacting 1,2-epoxides with the sodium salt of alpha-amino acids and then dry-distilling the resulting reaction product to form the morpholone. However, the above methods have not found commercial success due to poor product yield and high cost.

It is an object, therefore, of the present invention to provide a simple and inexpensive method for the preparation of substituted morpholones. A further object is to provide a method for dehydrogenating a substituted diethanolamine to the corresponding substituted morpholone in high conversions.

In accordance with the present invention, there is provided a process for producing substituted morpholones which comprises contacting, at about atmospheric pressure, a substituted diethanolamine with a reduced copper hydrogenation/dehydrogenation catalyst which is at a temperature of about 175° C. to about 300° C. Thus, it is seen that where the prior art requires starting materials which are difficult to obtain, such as amino acids, or requires sequential reaction with dissimilar compounds to form hydroxyethylglycines which must then be dehydrated to form the lactones, the process of this invention provides for the one-step conversion of an easily obtained starting material to the morpholone.

A highly satisfactory method of carrying out the process of this invention is to pass the substituted diethanolamine through a column packed with the reduced copper hydrogenation/dehydrogenation catalyst. The catalyst contained in the column may be heated to the required temperature by any suitable means such as surrounding the column with electric heating elements. In practice, certain of the diethanolamines with which this invention is concerned will vaporize on passing through the hot catalyst bed; however, such vaporization has no effect on the dehydrogenation of the amine to the corresponding morpholone.

The rate at which the substituted diethanolamine is passed through the catalyst bed is not critical. I have obtained excellent results at a rate of about 1.0 gram per gram of catalyst per hour. For example, if the catalyst bed contained 300 grams of catalyst I would pass the starting material through the bed at a rate of about 300 grams per hour. However, good results are achieved over the range of 0.2 to 2.5 grams of starting material per gram of catalyst per hour. In general, the lower limit on the feed rate is controlled by economic factors while operation at high feed rates results in some sacrifice in conversion and catalyst life.

Any of the well-known copper hydrogenation/dehydrogenation catalysts such as copper metal turnings, barium-stabilized copper chromite on silicate support, and metallic copper on an alumina support can be used in the process of this invention. Particularly outstanding results have been obtained with copper chromite and this catalyst constitutes a preferred catalyst in the process of this invention. The catalyst employed in this invention, when used in a continuous operation, must be reduced by treatment with hydrogen gas under carefully controlled temperature conditions, since use of the catalyst composition to dehydrogenate a substituted diethanolamine without first reducing the catalyst results in an uncontrollable exothermic reaction. It is also pointed out that water has an undesirable effect on the catalysts of this invention. For example, if the substituted iminodiethanol starting material is dissolved in water and the resulting aqueous solution then brought into contact with the catalyst bed, relatively poor conversions are obtained. Thus, free water should not be brought into contact with the catalyst.

The preferred copper chromite catalyst of this invention consists essentially of about 40–85 weight percent CuO and 60–15 weight percent $Cr_2O_3$. Desirably, the catalyst is pilled and used in a fixed bed operation and may be deposited on a support as long as the support is chemically neutral. Since pilling of the CuO–$Cr_2O_3$ catalyst is somewhat difficult when compositions having CuO contents in the lower reaches of the 40–85 weight percent range are used, catalyst compositions consisting essentially of 75–85 weight percent CuO and 25–15 weight percent $Cr_2O_3$ are preferred. Strong pellets can be prepared from such compositions and can be used in a fixed bed operation with regeneration by an oxidation-reduction procedure when the activity has fallen off.

The copper chromite catalyst which I have employed in carrying out the process of my invention are available from Harshaw Chemical Company and are identified by the supplier as Cu 0203T ⅛″, Cu 1107T ⅛″ and Cu 0801T ⅛″. The Cu 0203T ⅛″ copper chromite catalyst contains about 80 weight percent CuO, 18 weight percent $Cr_2O_3$ and about 2 weight percent graphite to aid in the pilling of the catalyst. The Cu 1107T ⅛″ is a barium-stabilized copper chromite on a silicate support and Cu 0801T ⅛″ is a metallic copper on an alumina support.

The process of this invention can be carried out in either the vapor or liquid phase and at a temperature of between 175 to 300° C. I have found that at temperatures below 175° C. the conversion of diethanolamine to morpholone was low while at temperatures above 300° C. pyrolysis was likely to occur. The preferred temperature range is from 200 to 245° C.

The process of this invention can be represented by the following equation:

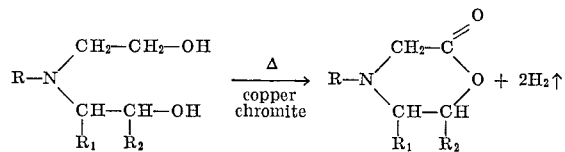

At this point, it should be noted that it is necessary that the nitrogen atom of the substituted diethanolamine be a tertiary nitrogen atom having three carbon atom linkages and that at least one of the ethanol groups be a primary alcohol. As long as these two requirements are satisfied, I have found that any class of hydrocarbon radicals may be substituted on the diethanolamine as the dehydrogenation reaction does not affect the hydrocarbon substituents nor do much substituents affect the catalytic formation of the morpholone. For practical considerations, it is preferred, although not necessary, to work with substituted diethanolamines in which the individual substituents do not contain more than 21 carbon atoms and which collectively contain not more than 25 carbon atoms. In addition, the radicals may have substituents such as oxygen atoms and hydroxy groups as well as other inert substituents. I have also found that sulfur atoms must not be present in the diethanolamine since they tend to deactivate the copper catalyst through which the diethanolamine is passed. Expressed in different terms, I have found that the R, $R_1$ and $R_2$ substituents on the diethanolamine starting materials of this invention may be comprised of any type radical with the exception of those which would result in well recognized unstable groupings, such as an oxygen atom or hydroxyl radical on an alpha carbon atom or a double bond adjacent to a nitrogen atom. Thus, the nitrogen atom in said diethanolamine must be separated from any aliphatic ethylenic unsaturation appearing in the molecule by at least one carbon atom. For example, compounds having a structure C=C—N are excluded from the scope of this invention, while those having a structure C=C—C—N are included. Likewise, the nitrogen atom in said diethanolamine must be separated from any carbon atom to which an oxygen atom is attached by at least one carbon atom. Hence, compounds having an oxygen atom or hydroxy radical attached to the alpha carbon atom are outside the scope of this invention.

Examples of radicals from which R, $R_1$ and $R_2$ may be selected are as follows: (1) alkyl radicals such as methyl, ethyl, propyl(n- and iso-), (n-, sec-, iso-, and tert-) butyl and amyl; hexyl radicals such as 2-hexyl, 3-hexyl, 2,2-dimethyl-3-butyl, 2,3-dimethyl-2-butyl, 4-hydroxyhexyl, 3-methyl - 2 - pentyl, 2-hydroxyhexyl; heptyl radicals such as 2-heptyl, 3-heptyl, 2,3-dimethyl-3-pentyl, 2,2,3-trimethyl - 3 - butyl, 3 - ethyl - 2 - pentyl; octyl radicals such as 4-octyl, 3-hydroxyoctyl, 2-ethylhexyl, 5-methyl - 5 - hydroxy - 3 - heptyl, 2,2,4 - trimethylpentyl; higher molecular weight alkyl radicals such as 1-decyl, lauryl, cetyl, stearyl and heneicosyl; (2) alkenyl radicals such as allyl, 2-butenyl, 4-hydroxycrotyl, 2-methyl-2-propenyl, 3-pentenyl, 2-hexenyl, 4-methyl - 2 - pentenyl, 3-heptenyl, 5-octenyl, 2,2,4-trimethyl - 3 - pentenyl, 2-nonenyl, 5-decenyl, 3-dodecenyl, 2,4,4,6,6-pentamethyl-2- heptenyl, 2-heptadecenyl and 3-heneicosenyl; (3) cycloalkyl radicals such as cyclopentyl, cyclohexyl, 2,3-dimethylcyclopentyl, 1-methyl-3-ethylcyclopentyl, hydroxycyclohexyl, 1,2,4 - trimethylcyclohexyl, 4-t-amyl - 2 - hydroxycyclohexyl, hexylcyclohexyl, isopropylcyclohexyl, 4 - capryl - 2 - hydroxycyclohexyl, and cycloheptyl; (4) aryl radicals such as phenyl, hydroxyphenyl, biphenylyl, terphenylyl, naphthyl, perylenyl, acenaphthenyl, anthryl and hydroxynaphthyl; (5) alkaryl radicals such as tolyl, dimethylhydroxyphenyl, ethylhydroxyphenyl, secbutylhydroxyphenyl, amylphenyl, nonenylphenyl, dodecylphenyl, trimethylhydroxyphenyl, alpha - hydroxyisopropylphenyl, isopropylnaphthyl, triethyl - beta - anthryl and diethylalpha - anthryl; (6) aralkyl radicals such as benzyl, phenylethyl, phenylpropyl, phenyloctadecyl, xenylmethyl, xenylethyl, naphthylmethyl, 2 - phenyl - 2 - hydroxyethyl, hydroxynaphthylethyl and naphthylethyl; (7) alkarylalkyl radicals such as dodecylbenzyl, ethylbenzyl, 4 - (2-hydroxydodecyl)benzyl, amylbenzyl, methylphenylethyl, amylphenylethyl, 2 - (4-ethylphenyl)ethyl, nonylphenylethyl, tridecenylphenylethyl, 2 - (4-methyl-3-hydroxyphenyl)ethyl and isopropylnaphthylethyl; (8) alkaryloxyalkyl radicals such as methylphenoxyethyl, amylphenoxyethyl, nonenylphenoxyethyl, tetradecenylphenoxyethyl, 2 - (4-methyl-2-hydroxyphenoxy)ethyl, nonenylphenoxypropyl, ethylnaphthyloxyethyl, 3 - (4-methylnaphthyloxy)propyl and amylnaphthyloxyethyl; and (9) alkoxyalkyl radicals such as n-propoxyethyl, isopropoxyethyl, isobutoxyethyl, 3 - decyloxy - 2 - hydroxypropyl, t-butoxyethyl, n-octoxyethyl, 2 - (2-hydroxydodecyloxy)ethyl, 2,3- diisobutoxypropyl, 2,3 - di-n-butoxypropyl, cyclohexoxymethyl and 2,3-dicyclohexoxybutyl.

Examples of substituted diethanolamines which can be used as starting materials in the method of this invention are N - methyl-2,2′-iminodiethanol, N-ethyl-2,2′-iminodiethanol, N-isopropyl-2,2′-iminodiethanol, N-t-butyl-2,2′-iminodiethanol, N - allyl-2,2′-iminodiethanol, 2,2′,2″-nitrilotriethanol, N-phenyl-2,2′-iminodiethanol, N-benzyl-2,2′-iminodiethanol, N-(4-dodecylphenyl)-2,2′-iminodiethanol, N-dodecyl-2,2′-iminodiethanol, N-tridecyl-2,2′-iminodiethanol, N-octadecyl-2,2′-iminodiethanol, N-(3-decyloxypropyl)-2,2′-iminodiethanol, N-(3-tridecyloxypropyl)-2,2′ - iminodiethanol, N-(3-octadecyloxypropyl)-2,2′-iminodiethanol, N-[2-hydroxy-3-(4′-nonylphenoxy)propyl]-2,2′-iminodiethanol, N,1-dimethyl-2,2′-iminodiethanol, 1-decyl - N-methyl-2,2′-iminodiethanol, 1-(tridecyloxymethyl) - N-methyl-2,2′-iminodiethanol and 1-(4′-nonylphenoxymethyl) - N - methyl-2,2′-iminodiethanol. While the above list of compounds is representative of the various types of substituted diethanolamines which can be dehydrogenated to the morpholone by the process of this invention, it is by no means intended as a complete list. The substituted diethanolamine starting compounds of this invention can be synthesized by the standard method of alkylene oxide addition to amines in the presence of water.

The process of this invention may be carried out in either batch or continuous operation and at subatmospheric, atmospheric or superatmospheric pressure. For practical considerations, I prefer continuous operation at atmospheric pressure.

The term "conversion" as used in this specification is defined as follows. Conversion is a measure of the percent of the charged substituted diethanolamine reactant that is converted to the desired substituted morpholone product. Conversion is calculated in accordance with the following equation:

Percent conversion=

$$\frac{\text{mols product obtained}}{\text{mols diethanolamine charged}} \times 100$$

The term "saponification equivalent" as used herein is the quantity of morpholone (in grams) that is saponified by one liter of normal alkali.

The following examples are supplied to illustrate the process of this invention and should not be employed to unduly restrict the invention in view of the disclosure of reactants, catalysts and conditions which have been set forth herein. In the examples in which a continuous process was employed, a catalyst bed of about 1 inch in diameter and 18 inches in depth was used.

*Example I*

The reactor system and procedure followed in all the work reported herein was generally the same. The reactor was a 4-foot length of 1-inch O.D. Pyrex tube covered by a heating jacket. The temperature in the reactor was measured through a thermocouple well which was centered inside the tube and and extended the length of the tube. Inert packing rings were positioned in the reactor at each end and separated from each other by about 18 inches and the catalyst, hereinbefore described, was placed between the two sections of inert packing rings. The reactor was fitted with the necessary feed system for liquids, inlet valves for gases, and a condenser system for collecting the product.

After charging about 277 grams of copper chromite catalyst containing about 80 weight percent CuO, 18 weight percent $Cr_2O_3$ and 2 weight percent graphite (Harshaw Cu 0203T ⅛″) to the reactor, the catalyst was reduced before use. The reduction process consisted of passing nitrogen over the catalyst bed at a rate of 100 liters per hour while the catalyst bed was heated to 200° C. The heat input to the catalyst bed was then lowered and hydrogen, at a rate of 50 liters per hour, was added to the nitrogen flow. A high temperature zone then developed at the top of the catalyst bed and the temperature rose rapidly to about 275° C.–300° C. at this zone of high temperature. The heat input was then further reduced and the nitrogen flow increased to 400 liters per hour. This gas mixture, 400 liters of nitrogen and 50–125 liters of hydrogen per hour, was then passed through the reactor for 2 hours while the zone of high temperature traveled down through the entire length of the catalyst bed. Adjustment of the hydrogen flow was made in order to maintain the temperature of the high temperature zone at about 275° C.–300° C. After the high temperature zone had traveled the length of the catalyst bed, the catalyst bed was heated to a temperature of 275° C.–300° C. and hydrogen gas was passed over the catalyst at a rate of 40 liters per hour for 3 hours to insure reduction of the catalyst.

Desiring to synthesize 4-methyl-6-decyl-2-morpholone, I first prepared 2-decyl-N-methyl-2,2′-iminodiethanol by charging N-methylethanolamine and water to a 2-liter, 3-neck round bottom flask which was fitted with a stirrer, thermometer, reflux condenser and heating mantle. The contents of the flask were heated and then redistilled dodecene oxide was added to the flask. The resulting reaction product was stripped of volatiles and 2-decyl-N-methyl-2,2′-iminodiethanol was recovered. I then passed 454 grams of the 2-decyl-N-methyl-2,2′-iminodiethanol at the rate of 0.8 gram per gram of catalyst per hour through the reduced copper chromite catalyst bed which was heated to a tempertaure of 294–234° C. Effluent from the reactor totalling 441 grams was collected and found to have a saponification equivalent of about 270 indicating it contained 95 percent 4-methyl-6-decyl-2-morpholone which represents a 94 percent conversion.

*Example II*

Using the same equipment and technique as set forth in Example I, I prepared 4-dodecyl-2-morpholone by passing 367 grams of N-dodecyl-2,2′-iminodiethanol at a rate of 0.6 gram per gram of catalyst through a reduced copper chromite catalyst bed which was heated to a temperature in the range of 207–230° C. The N-dodecyl-2,2′-iminodiethanol had been previously prepared by the addition of 2 mols of ethylene oxide to dodecylamine. Effluent from the reactor totalling 352 grams was collected which had a saponification equivalent of 284 indicating it contained 95 percent 4-dodecyl-2-morpholone which represents a 93 percent conversion.

*Example III*

This example illustrates the employment of different hydrogenation/dehydrogenation catalysts in the process of this invention. In making the runs reported herein, a batch technique was used in which the starting material and catalyst (powder) were added to a 1-liter 3-neck flask fitted with thermometer, stirrer, reflux condenser and gas scrubbing system. The contents of the flask were heated to a temperature in the range of 175–300° C. for a period of about one hour. At the end of this time, the reaction mixture was filtered through a Celite bed to remove the catalyst and the filtrate distilled to recover the product. The starting material used in each of the reported runs was N-ethyl-2,2′-iminodiethanol which was converted to the product 4-ethyl-2-morpholone. The following table shows the catalyst used, amount of reactants, conditions under which the runs were made, and the conversion obtained.

TABLE I

| Run No. | Catalyst | Catalyst charged (g.) | Starting material charged (g.) | Pot Temp., °C. | Contact time, minutes | Conversion, percent |
|---|---|---|---|---|---|---|
| 1 | 40% CuO–60% $Cr_2O_3$ [1] | 10 | 258 | 200–215 | 100 | 44 |
| 2 | 50% CuO–47% $Cr_2O_3$ [2] | 20 | 258 | 230–241 | 90 | 34 |
| 3 | 40% $CuO_3$–45% $Cr_2O_3$–10% BaO [3] | 20 | 258 | 211–236 | 93 | 46 |
| 4 | 80% CuO–20% $Cr_2O_3$ [4] | 20 | 258 | 229–234 | 60 | 55 |

[1] Harshaw Cu 1402 P, Harshaw Chemical Company.
[2] Harshaw Cu 1800 P, Harshaw Chemical Company.
[3] Harshaw Cu 1106 P, Harshaw Chemical Company.
[4] Harshaw Cu 0203 T, Harshaw Chemical Company (powdered before use).

*Example IV*

A series of runs was carried out employing substituted diethanolamines having substituents selected from a wide variety of chemical radicals. Some of the starting compounds were commercial products while others had to be synthesized by procedures analogous to that used in Example I. The equipment and procedure followed in these runs were the same. The catalyst used in each of these runs was the Cu 0203T ⅛″ copper chromite catalyst containing about 80 weight percent CuO, 18 weight percent $Cr_2O_3$ and 2 weight percent graphite.

TABLE II

| Starting Material | Feed Rate, g./g. of Catalyst/hr. | Temp.,° C., Catalyst bed | Product | Conversion percent |
|---|---|---|---|---|
| N-methyl-2,2'-iminodiethanol | 0.7 | 206-230 | 4-methyl-2-morpholone | 81 |
| N-ethyl-2,2'-iminodiethanol | 0.9 | 211-240 | 4-ethyl-2-morpholone | 83 |
| N-isopropyl-2,2'-iminodiethanol | 0.8 | 198-229 | 4-isopropyl-2-morpholone | 91 |
| N-t-butyl-2,2'-iminodiethanol | 0.4 | 218-270 | 4-t-butyl-2-morpholone | 77 |
| N-allyl-2,2'-iminodiethanol | 2.0 | 227-265 | 4-allyl-2-morpholone | 60 |
| 2,2',2''-nitrilotriethanol | 1.2 | 191-207 | 4-(2-hydroxyethyl)-2-morpholone | 61 |
| N-phenyl-2,2'-iminodiethanol | 1.1 | 229-264 | 4-phenyl-2-morpholone | 83 |
| N-benzyl-2,2'-iminodiethanol | 1.6 | 214-246 | 4-benzyl-2-morpholone | 68 |
| N-(4-dodecylphenyl)-2,2'-iminodiethanol | 2.1 | 240-265 | 4-dodecylphenyl-2-morpholone | 79 |
| N-tridecyl-2,2'-iminodiethanol | 1.0 | 216-230 | 4-tridecyl-2-morpholone | 73 |
| N-octadecyl-2-2'-iminodiethanol | 2.3 | 225-277 | 4-octadecyl-2-morpholone | 80 |
| N-(3-decyloxypropyl)-2,2'-iminodiethanol | 1.0 | 200-225 | 4-(3-decyloxypropyl)-2-morpholone | 79 |
| N-(3-tridecyloxypropyl)-2,2'-iminodiethanol | 1.1 | 196-223 | 4-(3-tridecyloxypropyl)-2-morpholone | 85 |
| N-(3-octadecyloxypropyl)-2,2'-iminodiethanol | 1.0 | 196-230 | 4-(3-octadecyloxypropyl)-2-morpholone | 93 |
| N-[2-hydroxy-3-(4'-nonylphenoxy)propyl]-2,2'-iminodiethanol | 1.5 | 205-233 | 4-[2-hydroxy-3-(4'-nonylphenoxy)-propyl]-2-morpholone | 46 |
| N-2-dimethyl-2,2'-iminodiethanol | 1.0 | 251-298 | 4,6-dimethyl-2-morpholone | 68 |
| 2-(tridecyloxymethyl)-N-methyl-2,2'-iminodiethanol | 0.8 | 214-234 | 4-methyl-6-tridecyloxymethyl-2-morpholone | 97 |
| 2-(4'-nonylphenoxymethyl)-N-methyl-2,2'-iminodiethanol | 1.1 | 222-238 | 4-methyl-6-(4'-nonylphenoxymethyl)-2-morpholone | 51 |

From the foregoing description and table showing results actually obtained in the laboratory, it is believed that the process of this invention constitutes a substantial advance over processes which have been heretofore reported for synthesizing substituted morpholones. Stated broadly, the process of this invention is one for producing substituted morpholones by passing a substituted diethanolamine through a reduced copper hydrogenation/dehydrogenation catalyst bed maintained at a temperature in the range of 175 to 300° C.

I claim:

1. A process for preparing "N-substituted-2-morpholones" which comprises intimately contacting a diethanolamine with a reduced copper hydrogenation/dehydrogenation catalyst at a temperature of about 175° to 300° C., said diethanolamine corresponding to the formula:

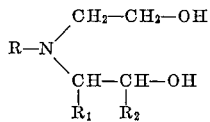

wherein R is a radical containing up to 21 carbon atoms and is selected from the group consisting of alkyl, alkenyl, cycloalkyl, aryl, alkaryl, aralkyl, alkarylalkyl, alkaryloxyalkyl, alkoxyalkyl, and the foregoing radicals having one hydroxyl substituent and $R_1$ and $R_2$ are selected from the group consisting of hydrogen and the aforementioned radicals from which R is selected; furthermore, the diethanolamine of the above formula must meet the following conditions:

(a) the nitrogen atom in said diethanolamine must be separated from any aliphatic ethylenic unsaturation appearing in the molecule by at least one carbon atom;

(b) the nitrogen atom in said diethanolamine must be separated from any carbon atom to which an oxygen atom is attached by at least one carbon atom; and (c) R, $R_1$ and $R_2$ collectively contain a maximum of 25 carbon atoms.

2. The process of claim 1 wherein the temperature is about 200 to about 245° C.

3. The process of claim 1 wherein the copper dehydrogenation catalyst consists of about 40-85 weight percent CuO and 60-15 weight percent $Cr_2O_3$.

4. A process for preparing N-substituted-2-morpholones which comprises intimately contacting a diethanolamine with a reduced copper chromite catalyst consisting essentially of about 75-85 weight percent CuO and 25-15 weight percent $Cr_2O_3$ at a temperature of about 200° C. to 245° C., said diethanolamine corresponding to the formula:

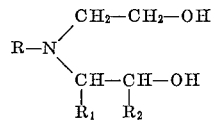

wherein R is a radical containing up to 21 carbon atoms and is selected from the group consisting of alkyl, alkenyl, cycloalkyl, aryl, alkaryl, aralkyl, alkarylalkyl, alkaryloxyalkyl, alkoxyalkyl, and the foregoing radicals having one hydroxyl substituent and $R_1$ and $R_2$ are selected from the group consisting of hydrogen and the aforementioned radicals from which R is selected; furthermore, the diethanolamine of the above formula must meet the following conditions:

(a) the nitrogen atom in said diethanolamine must be separated from any aliphatic ethylenic unsaturation appearing in the molecule by at least one carbon atom;

(b) the nitrogen atom in said diethanolamine must be separated from any carbon atom to which an oxygen atom is attached by at least one carbon atom; and (c) R, $R_1$ and $R_2$ collectively contain a maximum of 25 carbon atoms.

5. A process for preparing 4-methyl-2-morpholone which comprises intimately contacting N-methyl-2,2'-iminodiethanol with a reduced copper hydrogenation/dehydrogenation catalyst at a temperature of about 175° C. to 300° C.

6. A process for preparing 4-t-butyl-2-morpholone which comprises intimately contacting N-t-butyl-2,2'-iminodiethanol with a reduced copper hydrogenation/dehydrogenation catalyst at a temperature of about 175° C. to 300° C.

7. A process for preparing 4-octadecyl-2-morpholone which comprises intimately contacting N-octadecyl-2,2'-iminodiethanol with a reduced copper hydrogenation/dehydrogenation catalyst at a temperature of about 175° C. to 300° C.

8. A process for preparing 4-(2-hydroxyethyl)-2-morpholone which comprises intimately contacting 2,2',2''-nitrilotriethanol with a reduced copper hydrogenation/dehydrogenation catalyst at a temperature of about 175° C. to 300° C.

9. A process for preparing 4-allyl-2-morpholone which comprises intimately contacting N - allyl - 2-2'-iminodiethanol with a reduced copper hydrogenation/dehydrogenation catalyst at a temperature of about 175° C. to 300° C.

10. A process for preparing 4-phenyl-2-morpholone which comprises intimately contacting N-phenyl-2,2'-iminodiethanol with a reduced copper hydrogenation/dehydrogenation catalyst at a temperature of about 175° C. to 300° C.

11. A process for preparing 4-benzyl-2-morpholone which comprises intimately contacting N-benzyl-2,2'-iminodiethanol with a reduced copper hydrogenation/dehydrogenation catalyst at a temperature of about 175° C. to 300° C.

12. A process for preparing 4-dodecylphenyl-2-morpholone which comprises intimately contacting N-(4-dodecylphenyl)-2,2'-iminodiethanol with a reduced copper hydrogenation/dehydrogenation catalyst at a temperature of about 175° C. to 300° C.

13. A process for preparing 4(-3-octadecycloxpropyl)-2-morpholone which comprises intimately contacting N-(3-octadecycloxypropyl)-2,2'-iminodiethanol with a reduced copper hydrogenation/dehydrogenation catalyst at a temperature of about 175° C. to 300° C.

14. A process for preparing 4-[2-hydroxy-3-(4'-nonylphenoxy)-propyl]-2-morpholone which comprises intimately contacting N - [2-hydroxy-3-(4'-nonylphenoxy) propyl]-2,2'-iminodiethanol with a reduced copper hydrogenation/dehydrogenation catalyst at a temperature of about 175° C. to 300° C.

15. A process for preparing 4,6-dimethyl-2-morpholone which comprises intimately contacting N,2-dimethyl-2,2'-iminodiethanol with a reduced copper hydrogenation/dehydrogenation catalyst at a temperature of about 175° C. to 300° C.

16. A process for preparing 4-methyl-6-decyl-2-morpholone which comprises intimately contacting 2-decyl-N-methyl-2,2'-iminodiethanol with a reduced copper hydrogenation/dehydrogenation catalyst at a temperature of about 175° C. to 300° C.

17. A process for preparing 4-methyl-6-tridecyloxymethyl-2-morpholone which comprises intimately contacting 2 - (tridecyloxymethyl) - N-methyl-2,2'-iminodiethanol with a reduced copper hydrogenation/dehydrogenation catalyst at a temperature of about 175° C. to 300° C.

18. A process for preparing 4-methyl-6-(4'-nonylphenoxymethyl)-2-morpholone which comprises intimately contacting 2-(4'-nonylphenoxymethyl)-N-methyl-2,2'-iminodiethanol with a reduced copper hydrogenation/dehydrogenation catalyst at a temperature of about 175° C. to 300° C.

19. A process for preparing 4-isopropyl-2-morpholone which comprises intimately contacting N-isopropyl diethanolamine with a reduced copper hydrogenation/dehydrogenation/catalyst at a temperature of about 175° C. to 300° C.

20. A process for preparing 4-ethyl-2-morpholone which comprises intimately contacting N-ethyl diethanolamine with a reduced copper hydrogenation/dehydrogenation catalyst at a temperature of about 175° C. to 300° C.

21. A process for preparing 4-dodecyl-2-morpholone which comprises intimately contacting N-dodecyl diethanolamine with a reduced copper hydrogenation/dehydrogenation catalyst at a temperature of about 175° C. to 300° C.

References Cited

UNITED STATES PATENTS 2,142,033 12/1938 McNanee at al. ____ 260—340.2
3,073,822 1/1963 Schultz et al. ____ 260—247.76

FOREIGN PATENTS 699,945 12/1940 Germany.

OTHER REFERENCES

Ambrose et al., Gas Chromatography p. 28, Newenes 1961.

Burkofer at al., Chem. Ber., vol. 91, NR 7–12 pp. 2383–2387 (1958).

Komarewsky, Catalytic, Photochemical, Electrolytic Reactions, vol. II of Technique of Org. Chem., Catalytic Reactions (in general) pp. 18, 33, 34 and 164–167 in particular. 2nd Edition Interscience N.Y. 1956.

Houben-Weyl Methods of Org. Chem. Band VIII Sauerstoffverbindungen III Seivers p. 455 (1952).

Marek et al. The Catalytic Oxidation of Organic Compounds in the Vapor Phase (Chapters II and III in general). Note in particular pp. 73 and 74 A.C.S. Monograph N.Y. (1932).

Rodd Chem. of Carbon Compounds, vol. IVc p. 1479, Elsevier N.Y. (1960).

Schniepp et al. J. Am. Chem. Soc., vol. 69, p. 1545, 1947.

WALTER A. MODANCE, *Primary Examiner.*

A. D. SPEVACK, *Assistant Examiner.*